United States Patent
Kang et al.

(10) Patent No.: US 11,495,408 B2
(45) Date of Patent: Nov. 8, 2022

(54) MULTILAYER CERAMIC ELECTRONIC COMPONENT INCLUDING EXTERNAL ELECTRODE HAVING SURFACE ROUGHNESS

(71) Applicant: SAMSUNG ELECTRO-MECHANICS CO., LTD., Suwon-si (KR)

(72) Inventors: Jeong Mo Kang, Suwon-si (KR); Hyung Duk Yun, Suwon-si (KR); Eun Hee Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 266 days.

(21) Appl. No.: 16/842,455

(22) Filed: Apr. 7, 2020

(65) Prior Publication Data

US 2021/0090803 A1     Mar. 25, 2021

(30) Foreign Application Priority Data

Sep. 19, 2019    (KR) ........................ 10-2019-0115392

(51) Int. Cl.
     *H01G 4/232*      (2006.01)
     *H01G 4/012*      (2006.01)
     (Continued)

(52) U.S. Cl.
     CPC ........... *H01G 4/2325* (2013.01); *H01G 4/012* (2013.01); *H01G 4/248* (2013.01); *H01G 4/30* (2013.01); *H01G 4/1227* (2013.01)

(58) Field of Classification Search
     CPC ...... H01G 4/2325; H01G 4/012; H01G 4/248; H01G 4/30; H01G 4/1227; H01G 4/005; H01G 5/14
     See application file for complete search history.

(56) References Cited

U.S. PATENT DOCUMENTS

2009/0290284 A1*   11/2009   Gabler ................ H01G 4/2325
                                                                            361/321.1
2013/0107420 A1     5/2013   Sakurada et al.
(Continued)

FOREIGN PATENT DOCUMENTS

CN         104517728 A      4/2015
JP         H06-112085 A     4/1994
(Continued)

OTHER PUBLICATIONS

Chinese Office Action dated Jul. 20, 2022, issued in corresponding Japanese Patent Application No. 202010553719.3.

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A multilayer ceramic electronic component includes a ceramic body including a dielectric layer and first and second internal electrodes disposed to be stacked in a third direction with the dielectric layer interposed therebetween; and first and second external electrodes disposed on the third and fourth surfaces of the ceramic body, respectively. The first and second external electrodes comprise first and second base electrodes disposed to be in contact with the ceramic body and having a first conductive metal, and first and second conductive layers disposed on the first and second base electrodes and having a second conductive metal, and the first and second conductive layers have an average surface roughness (Ra) of 10.0 μm or more.

16 Claims, 5 Drawing Sheets

(51) Int. Cl.
    *H01G 4/248*     (2006.01)
    *H01G 4/30*     (2006.01)
    *H01G 4/12*     (2006.01)

(56) References Cited

U.S. PATENT DOCUMENTS

| | | | |
|---|---|---|---|
| 2014/0151101 A1 | 6/2014 | Lee et al. | |
| 2015/0041198 A1* | 2/2015 | Lee | H01G 2/06 361/301.4 |
| 2015/0098202 A1 | 4/2015 | Lee et al. | |
| 2015/0109718 A1* | 4/2015 | Choi | H01G 4/30 174/258 |
| 2015/0187500 A1* | 7/2015 | Kang | H01G 4/2325 427/79 |
| 2016/0093438 A1* | 3/2016 | Sasabayashi | H01G 4/12 361/301.4 |
| 2016/0284475 A1* | 9/2016 | Onoue | H01G 4/30 |
| 2017/0040112 A1* | 2/2017 | Tanaka | H01G 4/232 |
| 2018/0211776 A1* | 7/2018 | Lee | H05K 1/185 |
| 2021/0027945 A1* | 1/2021 | Takahashi | H01G 4/2325 |

FOREIGN PATENT DOCUMENTS

| | | | | |
|---|---|---|---|---|
| JP | 2000357627 A | * | 12/2000 | |
| JP | 2013-118357 A | | 6/2013 | |
| JP | 2014-110417 A | | 6/2014 | |
| JP | 2017118087 A | * | 6/2017 | H01G 4/005 |
| KR | 10-2014-0071723 A | | 6/2014 | |

* cited by examiner

MULTILAYER CERAMIC ELECTRONIC COMPONENT INCLUDING EXTERNAL ELECTRODE HAVING SURFACE ROUGHNESS

CROSS-REFERENCE TO RELATED APPLICATION

This application claims benefit of priority to Korean Patent Application No. 10-2019-0115392 filed on Sep. 19, 2019 in the Korean Intellectual Property Office, the disclosure of which is incorporated herein by reference in its entirety.

TECHNICAL FIELD

The present disclosure relates to a multilayer ceramic electronic component.

BACKGROUND

In recent years, with the trend for miniaturization of electronic products, multilayer ceramic electronic components are also required to be miniaturized and to have high capacity. In accordance with the demand for miniaturization and large capacity of multilayer ceramic electronic components, external electrodes of the multilayer ceramic electronic components are also becoming thinner.

In order to form external electrodes, conventionally, an external electrode paste is prepared by mixing glass, a base resin, an organic solvent, and the like with a conductive metal, the external electrode paste is applied to both end surfaces of the ceramic body, and then the ceramic body is sintered and a metal in the external electrode is sintered. The external electrode paste may serve to ensure chip airtightness and secure electrical connectivity with the chip using a conductive metal as a main material, and fill an empty space during sintering shrinkage of the metal by using glass as an auxiliary material, and at the same time, provide bonding force between the external electrode and the chip.

However, as multilayer ceramic electronic components have been miniaturized and increased in capacity, a design, increasing the number of laminated layers of internal electrodes to secure capacitance, and thus reducing a thickness of upper and lower cover layers is generally applied. Thus, when the external electrode is formed, the thickness thereof is thinner, and when the external electrode having a multi-layer structure is applied, the thickness of each layer of the external electrode is much thinner.

The multilayer ceramic electronic component to which the external electrode having the multilayer structure is applied may have a structure vulnerable to external physical and chemical impacts, and is a major cause of product quality deterioration due to a decrease in mechanical strength.

SUMMARY

An aspect of the present disclosure is to provide a multilayer ceramic electronic component capable of improving mechanical strength by improving bonding force between external electrodes of a multilayer structure that are sequentially stacked, even in the case that the external electrodes are formed to be thin, and preventing defects such as lifting, delamination, or the like between the external electrodes.

According to an aspect of the present disclosure, a multilayer ceramic electronic component includes a ceramic body including a dielectric layer and first and second internal electrodes disposed to be stacked in a third direction with the dielectric layer interposed therebetween, and having third and fourth surfaces opposed in a first direction, fifth and sixth surfaces opposed in a second direction, and first and second surfaces opposed in a third direction; and first and second external electrodes disposed on the third and fourth surfaces of the ceramic body, respectively. The first and second external electrodes may include first and second base electrodes disposed to be in contact with the ceramic body and having a first conductive metal, and first and second conductive layers disposed on the first and second base electrodes and having a second conductive metal. The first and second conductive layers may have an average surface roughness (Ra) of 10.0 μm or more.

According to an aspect of the present disclosure, a multilayer ceramic electronic component includes a ceramic body including first and second internal electrodes and a dielectric layer disposed between the first and second internal electrodes; and an external electrode disposed on the ceramic body and connected to one of the first and second internal electrodes. The external electrode comprises a base electrode in contact with the ceramic body and having a first conductive metal, and a conductive layer disposed on the base electrode and having a second conductive metal. An average surface roughness of an inner surface of the conductive layer in contact with the base electrode, and an average surface roughness of an outer surface of the conductive layer opposing the inner surface, are greater than an average surface roughness of a surface of the base electrode in contact with the ceramic body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
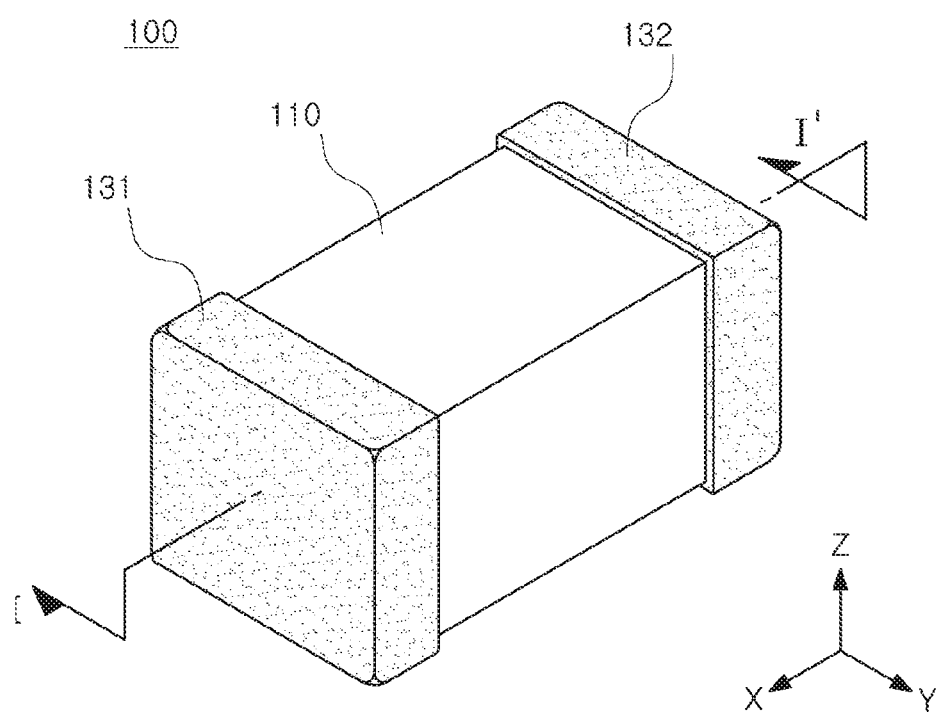
FIG. 1 is a schematic perspective view illustrating a multilayer ceramic electronic component according to an embodiment of the present disclosure.

Hereinafter, embodiments of the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, an X direction may be defined as a first direction, an L direction or a longitudinal direction, a Y direction may be defined as a second direction, a W direction or a width direction, and a Z direction may be defined as a third direction, a T direction or a thickness direction.

Figure 2:
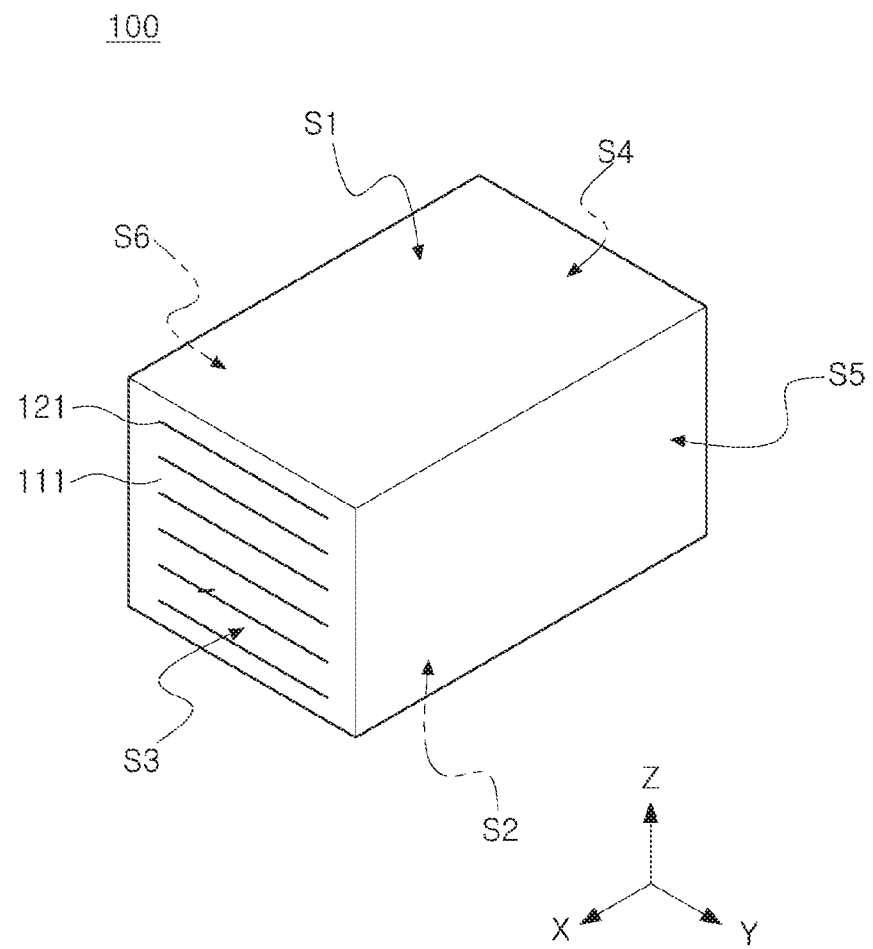
FIG. 2 is a schematic perspective view illustrating a ceramic body of FIG. 1.
Figure 3:
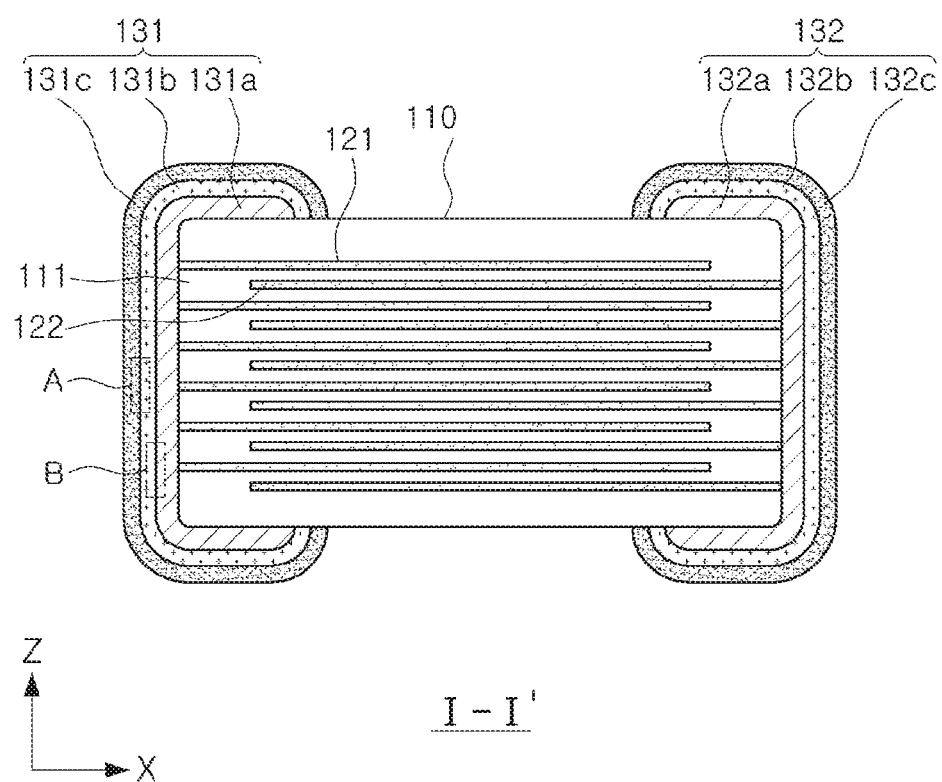
FIG. 3 is a cross-sectional view taken along line I-I' of FIG. 1.
Figure 4:
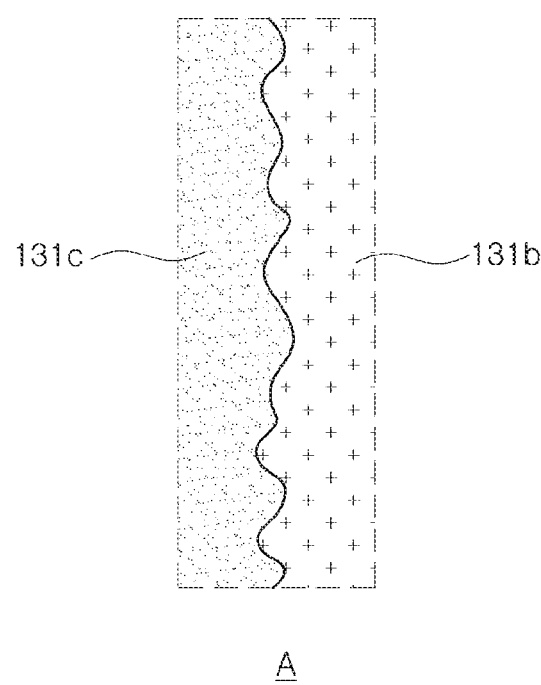
FIG. 4 is an enlarged view of region A of FIG. 1.
Figure 5:
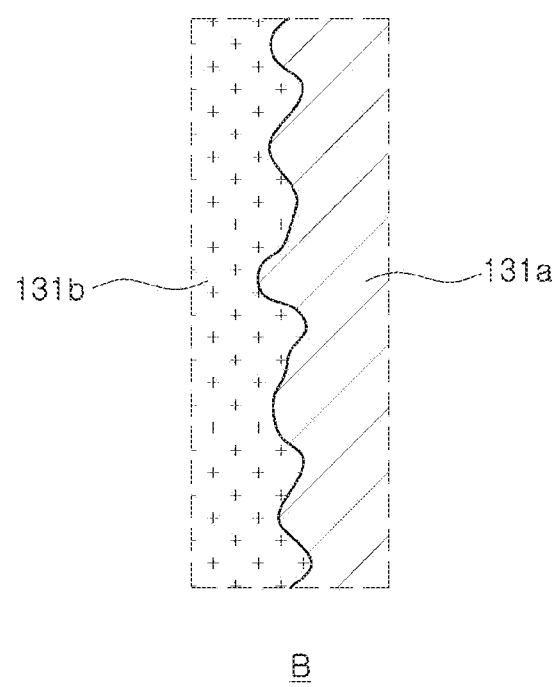
FIG. 5 is an enlarged view of region B of FIG. 1.

Hereinafter, a multilayer ceramic electronic component according to an embodiment of the present disclosure will be described in detail with reference to FIGS. 1 to 5.

Referring to FIGS. 1 to 5, a multilayer ceramic electronic component 100 according to an embodiment of the present disclosure may include a ceramic body 110 including a dielectric layer 111 and first and second internal electrodes 121 and 122 disposed to be stacked in a third direction (the Z direction) with the dielectric layer 111 interposed therebetween, and having third and fourth surfaces opposed in a first direction (the X direction), fifth and sixth surfaces S5 and S6 opposed in a second direction (the Y direction), and first and second surfaces S1 and S2 opposed in a third direction (the Z direction); and first and second external electrodes 131 and 132 disposed on the third surface S3 and the fourth surface S4 of the ceramic body 110, respectively. The first and second external electrodes 131 and 132 may include first and second base electrodes 131a and 132a disposed to be in contact with the ceramic body 110 and having a first conductive metal and first and second conductive layers 131b and 132b disposed on the first and second base electrodes 131a and 132a and having a second conductive metal. In this case, the first and second conductive layers 131b and 132b may have an average surface roughness (Ra) of 10.0 µm or more.

In the present specification, an average surface roughness (Ra) of a surface may be a value measured using an optical surface profiler such as a 7300 optical surface profiler by Zyro Corporation, or using a surface roughness measurer SV-3200 by Mitutoyo Corporation. An upper limit of the average surface roughness (Ra) of the first and second conductive layers 131b and 132b of the multilayer ceramic electronic component according to the present disclosure is not limited thereto, but may be, for example, 100 µm or less. When the average surface roughness (Ra) of the first and second conductive layers 131b and 132b satisfies the above-range, contact with the first and second base electrodes 131a and 132a may be improved as described below, and bonding force with the first and second terminal electrodes 131c and 132c may be improved. An average surface roughness of an inner surface of the first conductive layer 131b in contact with the first base electrode 131a, and an average surface roughness of an outer surface of the first conductive layer 131b opposing the inner surface thereof, may be greater than an average surface roughness of a surface of the first base electrode 131a in contact with the ceramic body 110. An average surface roughness of an inner surface of the second conductive layer 132b in contact with the second base electrode 132a, and an average surface roughness of an outer surface of the second conductive layer 132b opposing the inner surface thereof, may be greater than an average surface roughness of a surface of the second base electrode 132a in contact with the ceramic body 110.

Although the specific shape of the ceramic body 110 is not particularly limited, as shown, the ceramic body 110 may be formed in a hexahedral shape or a shape similar thereto. Due to shrinkage of ceramic powder contained in the ceramic body 110 during a firing process, the ceramic body 110 may have a substantially hexahedral shape, although not a hexahedral shape having a perfect straight line. The ceramic body 110 may have first and second surfaces S1 and S2 opposing each other in a thickness direction (the Z direction), fifth and sixth surfaces S5 and S6 connected to the first and second surfaces S1 and S2 and opposing each other in a width direction (the Y direction), and third and fourth surfaces S3 and S4 connected to the first and second surfaces S1 and S2, connected to the fifth and sixth surfaces S5 and S6 and opposing each other in a longitudinal direction (the X direction).

The ceramic body 110 may be formed by alternately stacking a ceramic green sheet on which the first internal electrode 121 is printed on the dielectric layer 111 and a ceramic green sheet on which the second internal electrode 122 is printed on the dielectric layer 111 in a thickness direction (the Z direction).

In the ceramic body 110, the dielectric layer 111 and internal electrodes 121 and 122 may be alternately stacked in a third direction. A plurality of dielectric layers 111 forming the ceramic body 110 are in a sintered state, and boundaries between adjacent dielectric layers 111 may be integrated such that they may be difficult to confirm without using a scanning electron microscope (SEM).

According to an embodiment of the present disclosure, a raw material for forming the dielectric layer 111 is not limited as long as sufficient capacitance can be obtained therewith. For example, a barium titanate-based material, a lead composite perovskite-based material, a strontium titanate-based material, or the like can be used.

In addition, as a material for forming the dielectric layer 111, various ceramic additives, organic solvents, plasticizers, binders, dispersants, and the like, may be added to powder such as powder barium titanate ($BaTiO_3$) according to the purpose of the present disclosure.

For example, the dielectric layer 111 may be formed by applying and drying a slurry formed of a powder such as barium titanate ($BaTiO_3$) powder on a carrier film to prepare a plurality of ceramic sheets. The ceramic sheet may be formed by mixing ceramic powder, a binder, and a solvent to prepare a slurry, and manufacturing the slurry into a sheet having a thickness of several µms by a doctor blade method, but is not limited thereto.

In the multilayer ceramic electronic component, a plurality of internal electrodes 121 and 122 may be disposed to oppose each other with the dielectric layer 111 interposed therebetween. The internal electrodes 121 and 122 may include first and second internal electrodes 121 and 122 that are alternately disposed to oppose each other with the dielectric layer 111 interposed therebetween.

The first internal electrode 121 may be exposed to one surface of the ceramic body 110 in the first direction (the X direction), and a portion exposed to the one surface in the first direction (the X direction) may be connected to a first external electrode 131. The second internal electrode 122 may be exposed to the other surface of the ceramic body 110 in the first direction (the X direction), and a portion exposed to the other surface in the first direction (the X direction) may be connected to a second external electrode 132. The first and second internal electrodes 121 and 122 may be electrically separated from each other by the dielectric layer 111 disposed therebetween.

A material for forming the first and second internal electrodes 121 and 122 is not particularly limited, but, may be formed using, for example, a conductive paste including one or more materials of silver (Ag), palladium (Pd), gold (Au), platinum (Pt), nickel (Ni), copper (Cu), tin (Sn), tungsten (W), titanium (Ti), and alloys thereof. As the printing method of the conductive paste, a screen printing method, a gravure printing method, or the like may be used, but the present disclosure is not limited thereto.

In the multilayer ceramic electronic component according to the present disclosure, a margin portion may be disposed on both surfaces of the ceramic body 110 in a second direction. The margin portion may be disposed on both surfaces of the ceramic body 110 in a second direction (the Y direction) perpendicular to the first and third directions (the X direction and the Z direction), respectively. The margin portion may serve to prevent damages to internal electrodes due to physical or chemical stresses.

The margin portion may be made of an insulating material, and may be made of a ceramic material such as barium titanate, or the like. In this case, the margin portion may include the same ceramic material as that included in the dielectric layer 111, or may be made of the same material as the dielectric layer 111.

A method for forming the margin portion is not particularly limited. For example, the margin portion may be formed by forming an area of the dielectric layer included in the ceramic body 110 to be greater than an area of the internal electrode, such that a margin area may be formed in a peripheral portion of the internal electrode except for the portion connected to the external electrode or forming by applying a slurry including a ceramic or attaching the dielectric sheet to both surfaces of the ceramic body 110 in a second direction (the Y direction).

The multilayer ceramic electronic component according to the present disclosure may include a cover portion. The cover portion may be disposed at an outermost portion of the first and second internal electrodes 121 and 122. The cover portion may be disposed below an internal electrode of a lowermost portion of the ceramic body 110 and above an internal electrode of an uppermost portion. In this case, the cover portion may be formed of the same composition as the dielectric layer 111, and the cover portion may be formed by stacking one or more dielectric layers that do not include an internal electrode on an upper portion of the uppermost internal electrode of the ceramic body 110 and a lower portion of the lowermost internal electrode, respectively. The cover portion may basically serve to prevent damages to internal electrodes due to physical or chemical stresses.

In the multilayer ceramic electronic component according to the present disclosure, a first external electrode 131 and a second external electrode 132 may be disposed on both surfaces of the ceramic body in a first direction (the X direction). The first external electrode 131 may be electrically connected to the first internal electrode 121, and the second external electrode 132 may be electrically connected to the second internal electrode 122.

The first and second external electrodes 131 and 132 may include first and second base electrodes 131a and 132a disposed on the third surface S3 and the fourth surface S4 of the ceramic body 110, and including a first conductive metal, and first and second conductive layers 131b and 132b disposed on the first and second base electrodes 131a and 132a, and including a second conductive metal, respectively. In this case, the first conductive metal and the second conductive metal may have different components from each other.

In the present specification, the first conductive metal and the second conductive metal have different components from each other, which may mean that the first conductive metal and the second conductive metal are different compounds from each other, and the second conductive metal does not include the same component as the first conductive metal. In one example, the first conductive metal included in the first and second base electrodes 131a and 132a of the present disclosure may include copper (Cu), and in this case, the second conductive metal may not include copper (Cu).

In an embodiment of the present disclosure, the first base electrode 131a and the second base electrode 132a may include a first conductive metal and glass. The first conductive metal included in the first base electrode 131a and the second base electrode 132a may be copper (Cu), but is not limited thereto, and may be one or more conductive metals of, for example, nickel (Ni) and tin (Sn), palladium (Pd), platinum (Pt), gold (Au), silver (Ag), tungsten (W), titanium (Ti), lead (Pb) and alloys thereof.

In addition, a glass component included in the first base electrode 131a and the second base electrode 132a may have a composition in which oxides are mixed. The glass component may be, for example, one or more selected from a group consisting of a silicon oxide, a boron oxide, an aluminum oxide, a transition metal oxide, an alkaline metal oxide, and an alkaline earth metal oxide, but is not limited thereto. The transition metal may be one or more selected from a group consisting of zinc (Zn), titanium (Ti), copper (Cu), vanadium (V), manganese (Mn), iron (Fe) and nickel (Ni), the alkaline metal may be one or more selected from a group consisting of lithium (Li), sodium (Na) and potassium (K), and the alkaline earth metal may be one or more selected from a group consisting of magnesium (Mg), calcium (Ca), strontium (Sr), and barium (Ba).

A method for forming the first base electrode 131a and the second base electrode 132a is not particularly limited. For example, the first base electrode 131a and the second base electrode 132a may be formed using various methods, by dipping a ceramic body into a conductive paste including a conductive paste and glass, by printing the conductive paste on the surface of the ceramic body by using a screen printing method, a gravure printing method, or the like, or by applying the conductive paste to the surface of the ceramic body or transferring a dry film formed by drying the conductive paste onto the ceramic body, but is not limited thereto.

In an embodiment of the present disclosure, an average surface roughness (Ra) of the first base electrode 131a and the second base electrode 132a may be 1.0 μm or more. An upper limit of the average surface roughness (Ra) of the first base electrode 131a and the second base electrode 132a is not particularly limited, but may be, for example, 100 μm or less. When the average surface roughness (Ra) of the first base electrode 131a and the second base electrode 132a satisfies the above range, adhesion between the first conductive layer 131b and the second conductive layer 132b may be improved.

In an embodiment of the present disclosure, the second conductive metal included in the first conductive layer 132a and the second conductive layer 132b may have a higher standard reduction potential than the first conductive metal. In the present specification, a standard reduction potential may refer to a potential when an activity of all species participating in an oxidation reduction reaction under a condition of 25° C. electrolyte concentration of 1M and 1 atm is 1, and it may mean a value measured using a standard hydrogen electrode as 0.00V. The standard reduction potential shows a relative tendency of reduction/oxidation between different materials. The higher the standard reduction potential, the stronger the tendency to be reduced, and the lower the standard reduction potential, the stronger the tendency to be oxidized. Therefore, in the present embodiment, the standard reduction potential of the second conductive metal is higher than that of the first conductive metal, which may mean that the first conductive metal has a strong tendency to be oxidized, and the second conductive metal has a strong tendency to be reduced.

In one example, the second conductive metal of the multilayer ceramic electronic component according to the present disclosure may have a standard reduction potential of 0.1V or more. The second conductive metal may have a standard reduction potential of 0.1 V or more, 0.15 V or more, 0.20 V or more, 0.25 V or more, or 0.30 V or more, and may be 2.87 V or less or 1.99 V or less. Since the standard reduction potential of the second conductive metal satisfies the above range, the first and second conductive layers may be formed as described later, and bonding force of the first and second conductive layers 131$b$ and 132$b$ and the first and second terminal electrodes 131$a$ and 132$a$ may be improved.

When the second conductive metal has a higher standard reduction potential than the first conductive metal, the second conductive metal may be reduced on the first conductive metal. For example, when the ceramic body 110 in which the first base electrode 131$a$ and the second base electrode 132$a$ are formed is immersed in an aqueous solution in which the second conductive metal is dissolved in a form of ions, the second conductive metal is reduced and precipitated on the first base electrode 131$a$ and the second base electrode 132$a$. The second conductive metal precipitated on the first base electrode 131$a$ and the second base electrode 132$a$ may have a form of a film as a whole, and may form a first conductive layer 131$b$ and a second conductive layer 132$b$. That is, the first conductive layer 131$b$ and the second conductive layer 132$b$ may be reduced layers of a second conductive metal.

An oxidation reduction reaction on an aqueous solution of a certain substance proceeds randomly on a surface of a substance having a solid phase. For example, when a first base electrode 131$a$ and a second base electrode 132$a$ containing the first conductive metal are immersed in an aqueous solution in which a second conductive metal having a higher standard reduction potential than the first conductive metal is dissolved, the first conductive metal of the first base electrode 131$a$ and the second base electrode 132$a$ are randomly oxidized, and at the same time, the second conductive metal is randomly reduced on the first base electrode 131$a$ and the second base electrode 132$a$. In this case, the first conductive layer 131$b$ and the second conductive layer 132$b$ reduced on the first base electrode 131$a$ and the second base electrode 132$a$ may be a single composition layer of the second conductive metal. In addition, since the first conductive metal included in the first base electrode 131$a$ and the second base electrode 132$a$ is randomly oxidized, surfaces of the first base electrode 131$a$ and the second base electrode 132$a$ may have an average surface roughness (Ra) described above.

According to an embodiment of the present disclosure, when the first base electrode 131$a$ and the second base electrode 132$a$ include a first conductive metal and glass, a region in which the first conductive metal and the second conductive metal are in contact with an interface between the first conductive layer 131$b$ and the first base electrode 131$a$ or an interface between the second conductive layer 132$b$ and the second base electrode 132$a$, and a region in which the glass and the second conductive metal are in contact, may be randomly disposed. As described above, the first base electrode 131$a$ and the second base electrode 132$a$ including the first conductive metal are immersed in an aqueous solution in which the second conductive metal having a higher standard reduction potential than the first conductive metal is dissolved, the first conductive metal is randomly oxidized, and at the same time, the second conductive metal is reduced on the first base electrode 131$a$ and the second base electrode 132$a$. In this case, the first conductive metal and glass may be randomly disposed on the surfaces of the first base electrode 131$a$ and the second base electrode 132$a$ on which the second conductive metal is reduced.

Therefore, when the first conductive layer 131$b$ and the second conductive layer 132$b$ are formed on the first base electrode 131$a$ and the second base electrode 132$a$ by reduction, a region in which the first conductive metal and the second conductive metal are in contact with an interface between the first conductive layer 131$b$ and the first base electrode 131$a$ or an interface between the second conductive layer 132$b$ and the second base electrode 132$a$, and a region in which the glass and the second conductive metal are in contact, may be randomly disposed.

In an embodiment of the present disclosure, the first and second conductive layers 131$b$ and 132$b$ may include one or more structures selected from a group consisting of nanoparticles, nanowires, nanorods, nanobars, nanobelts, nanodisks, nanotubes, and nanotetrapods. When the first conductive layer 131$b$ and the second conductive layer 132$b$ are formed by liquid reduction in an aqueous solution, the second conductive metal reduced on the first base electrode 131$a$ and the second base electrode 132$a$ will form a structure of a fine size. The structure may have a shape that is randomly selected, and may have one or more shapes of the structures described above. When the first conductive layer 131$b$ and the second conductive layer 132$b$ include one or more of the structures, adhesion to terminal electrodes described later may be improved, thereby preventing lifting or delamination of external electrodes.

In an embodiment of the present disclosure, the multilayer ceramic electronic component according to the present disclosure may include a first terminal electrode 131$c$ disposed on the first conductive layer 131$b$ and a second terminal electrode 132$c$ disposed on the second conductive layer 132$b$. The first and second terminal electrodes 131$c$ and 132$c$ may be formed using a conductive paste containing a conductive metal, or may be formed by transferring a dry film drying the conductive paste onto the ceramic body or formed by sputtering or electric deposition, but is not limited thereto.

A material for forming the first and second terminal electrodes 131$c$ and 132$c$ is not particularly limited, but may include nickel (Ni), copper (Cu), tin (Sn), palladium (Pd), platinum (Pt), gold (Au), silver (Ag), tungsten (W), titanium (Ti), lead (Pb), or the like, or alloys thereof. The first and second terminal electrodes 131$c$ and 132$c$ may be included to improve mountability, structural reliability, external durability, heat resistance and/or an equivalent series resistance (ESR) with a substrate.

As set forth above, according to an embodiment of the present disclosure, it is possible to provide a multilayer ceramic electronic component capable of improving bonding force between external electrodes while being formed to be thinly.

According to another embodiment of the present disclosure, a multilayer ceramic electronic component having improved mechanical strength may be provided.

According to another embodiment of the present disclosure, a multilayer ceramic electronic component capable of preventing a lifting phenomenon or delamination between external electrodes may be provided.

However, various and advantageous advantages and effects of the present disclosure are not limited to the above description, and will be more readily understood in the course of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
    a ceramic body including a dielectric layer and first and second internal electrodes stacked in a third direction with the dielectric layer interposed therebetween, and having a third surface and a fourth surface opposed in a first direction, a fifth surface and a sixth surface opposed in a second direction, and a first surface and a second surface opposed in the third direction; and
    first and second external electrodes disposed on the third and fourth surfaces of the ceramic body, respectively,
    wherein the first external electrode comprises a first base electrode disposed to be in contact with the ceramic body and having a first conductive metal, a first conductive layer disposed on the first base electrode and having a second conductive metal, and a first terminal electrode covering the first conductive layer,
    the second external electrode comprises a second base electrode disposed to be in contact with the ceramic body and having the first conductive metal, a second conductive layer disposed on the second base electrode and having the second conductive metal, and a second terminal electrode covering the second conductive layer, and
    the first and second conductive layers have an average surface roughness (Ra) of 10.0 μm or more.

2. The multilayer ceramic electronic component of claim 1, wherein the first and second base electrodes and the first and second conductive layers comprise conductive metals different from each other.

3. The multilayer ceramic electronic component of claim 1, wherein the first and second base electrodes comprise the first conductive metal and glass.

4. The multilayer ceramic electronic component of claim 3, wherein a region in which the first conductive metal and the second conductive metal are in contact with an interface between the first base electrode and the first second conductive layer or an interface between the second base electrode and the second conductive layer, and a region in which the glass and the second conductive metal are in contact, are randomly disposed.

5. The multilayer ceramic electronic component of claim 1, wherein the first and second base electrodes comprise copper (Cu).

6. The multilayer ceramic electronic component of claim 1, wherein the first and second base electrodes have an average surface roughness (Ra) of 1.0 μm or more.

7. The multilayer ceramic electronic component of claim 1, wherein a standard reduction potential of the second conductive metal is higher than a standard reduction potential of the first conductive metal.

8. The multilayer ceramic electronic component of claim 1, wherein the second conductive metal has a standard reduction potential of 0.1V or more.

9. The multilayer ceramic electronic component of claim 1, wherein each of the first and second conductive layers is a single composition layer of the second conductive metal.

10. The multilayer ceramic electronic component of claim 1, wherein each of the first and second conductive layers includes a reduced layer of the second conductive metal.

11. The multilayer ceramic electronic component of claim 1, wherein the first and second conductive layers comprise one or more structures selected from a group consisting of nanoparticles, nanowires, nanorods, nanobars, nanobelts, nanodisks, nanotubes, and nanotetrapods.

12. A multilayer ceramic electronic component, comprising:
    a ceramic body including first and second internal electrodes and a dielectric layer disposed between the first and second internal electrodes; and
    an external electrode disposed on the ceramic body and connected to one of the first and second internal electrodes,
    wherein the external electrode comprises a base electrode in contact with the ceramic body and having a first conductive metal, and a conductive layer disposed on the base electrode and having a second conductive metal,
    an average surface roughness of an inner surface of the conductive layer in contact with the base electrode, and an average surface roughness of an outer surface of the conductive layer opposing the inner surface, are greater than an average surface roughness of a surface of the base electrode in contact with the ceramic body,
    a standard reduction potential of the second conductive metal is higher than a standard reduction potential of the first conductive metal, and
    the first conductive metal is copper (Cu).

13. The multilayer ceramic electronic component of claim 12, wherein the base electrode and the conductive layer comprise conductive metals different from each other.

14. The multilayer ceramic electronic component of claim 12, wherein the base electrode comprises the first conductive metal and glass.

15. The multilayer ceramic electronic component of claim 12,
    wherein the conductive layer comprises one or more structures selected from a group consisting of nanoparticles, nanowires, nanorods, nanobars, nanobelts, nanodisks, nanotubes, and
    nanotetrapods.

16. The multilayer ceramic electronic component of claim 12, further comprising a terminal electrode covering the conductive layer.

* * * * *